United States Patent [19]

Rogers, deceased

[11] Patent Number: 4,554,781
[45] Date of Patent: Nov. 26, 1985

[54] AIRBORNE TREE TRIMMER

[75] Inventor: Randall Rogers, deceased, late of Pea Ridge, Ark., by Mary L. Rogers, administrator

[73] Assignee: Aerial Solutions, Inc., New Roads, La.

[21] Appl. No.: 623,882

[22] Filed: Jun. 25, 1984

[51] Int. Cl.⁴ ............................................. A01D 55/18
[52] U.S. Cl. ....................................... 56/235; 56/11.9; 56/DIG. 9
[58] Field of Search .................. 56/235, 233, 234, 256, 56/255, 11.9, 328 R, 327 R

[56] References Cited

U.S. PATENT DOCUMENTS 4,302,922 12/1981 Gueradt et al. ........................ 56/235
4,422,284 12/1983 Fandrich et al. ................... 56/328 R Primary Examiner—John J. Wilson
Assistant Examiner—John G. Weiss
Attorney, Agent, or Firm—Edgar E. Speilman, Jr.

[57] ABSTRACT

There is disclosed tree trimmer apparatus for installation on a helicopter or the like including a boom hanging vertically downward from the helicopter carrying a plurality of circular saws arranged with their blades nearly adjacent over a length of at least twenty feet on the boom, which is attached to the helicopter in a manner to be constrained against rotation about a vertical axis and to have rotational movement about a horizontal axis at right angles to the normal direction of motion of said helicopter; the blades are preferably powered by a hydraulic motor with groups of five 24-inch blades being driven through belts by one hydraulic motor provided with hydraulic fluid under pressure from a pump in the helicopter. A foot at the bottom of the boom extends to the rear and permits the apparatus to be landed with the bottom of the boom on a landing surface by maneuvering the helicopter backward to lay the boom and saw blades on the ground in front of the helicopter. A pusher rod extends downward from an arm on the top of the boom to push tree branches off of or away from a power line as the branches are being cut; a quick release hook between the top of the boom structure and the helicopter and quick release hydraulic connections permit the apparatus to be dropped in an emergency.

23 Claims, 15 Drawing Figures

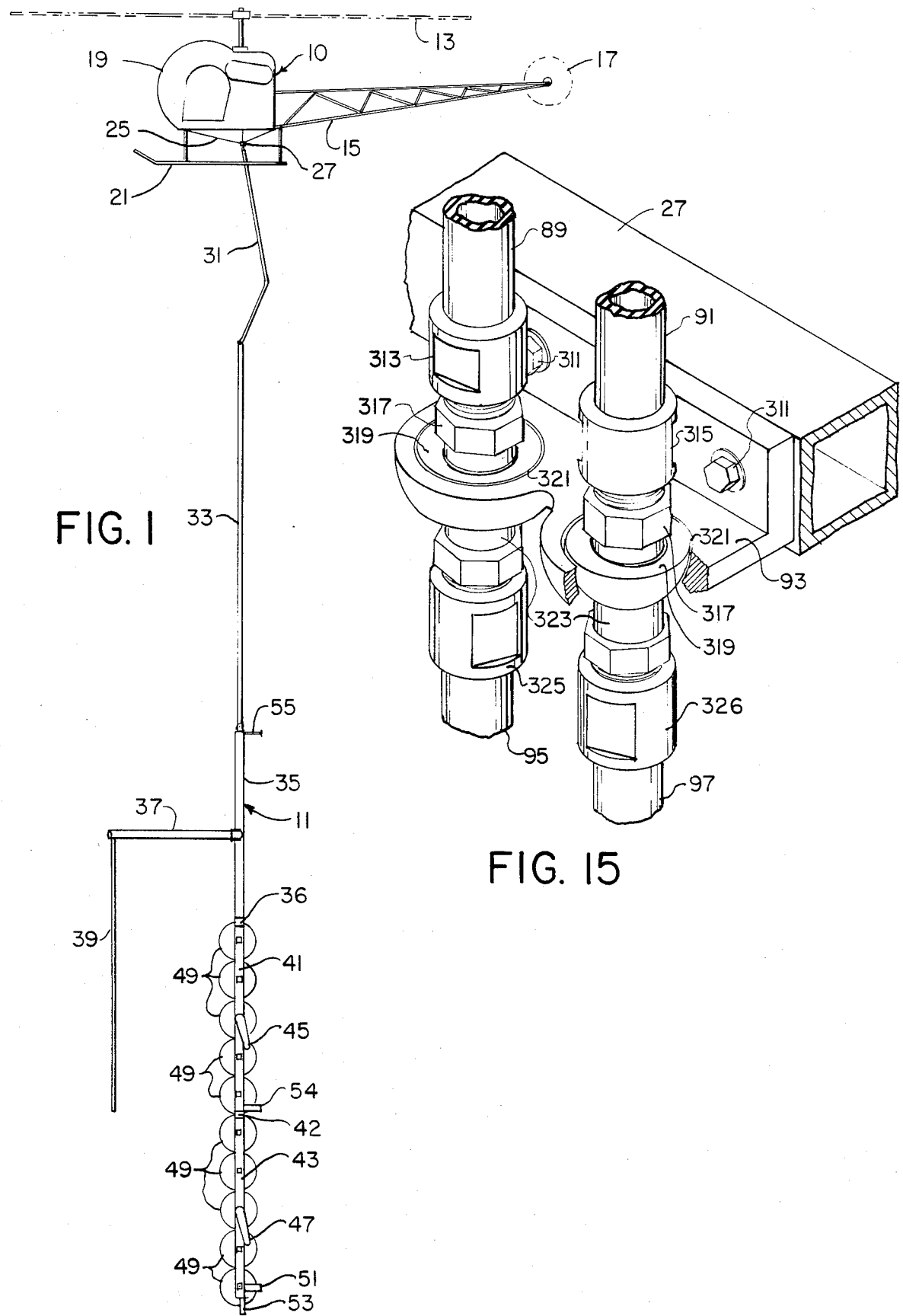

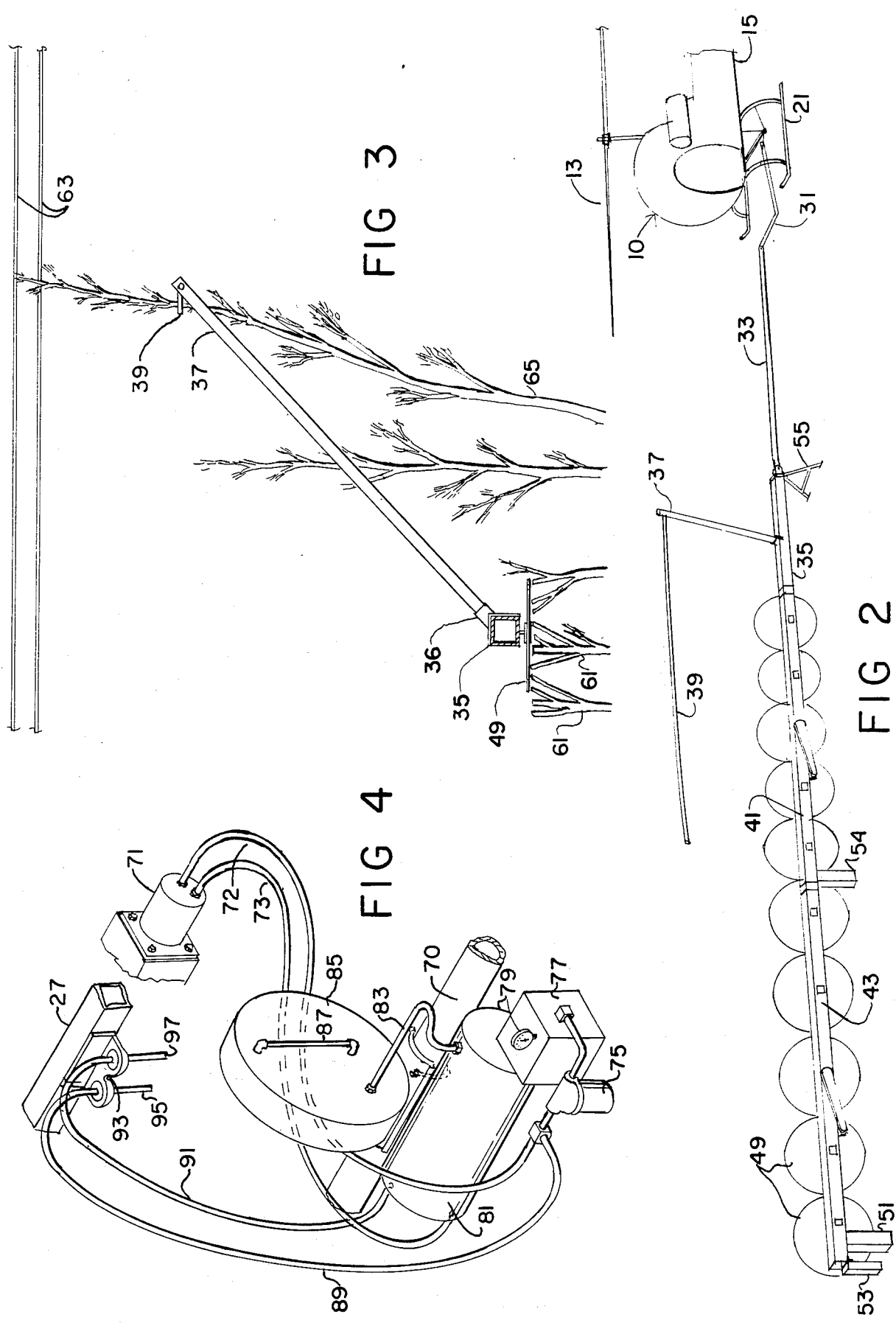

AIRBORNE TREE TRIMMER

The present invention relates to tree trimming apparatus especially that suitable for trimming the right of way adjacent to electric power lines. In the preferred embodiment the apparatus includes a long boom for suspension below the helicopter undercarriage with ten or more two foot circular saw blades mounted nearly edge to edge on the boom. The saw blades are powered by hydraulic motors receiving pressurized hydraulic fluid from a pump in the helicopter driven either by the main helicopter engine or an auxiliary engine. The large saw blades extend about ten inches out from the boom structure and thus quite large tree branches of six to eight inches or more may readily be cut by the large circular saw blades.

The blades rotate in the fore and aft vertical plane of the helicopter with all blades being to either the right or the left of the supporting boom. The blades have a shaft which is cantilever mounted so the outside surface of the blade is essentially smooth. Thus as the helicopter passes along the edge of trees to be cut, the blades are on the tree side of the boom and engage the branches to be cut and cut them through before the branches are reached by the boom and the cut branches fall away on the boom side of the apparatus. One may switch the saw carrying boom sections top for bottom on the ground to move the blades to the left side (the boom support feet are moved to the rear) of the saw teeth. In absence of significant tail-wind, the usual practice will be to fly the helicopter along one side of a power line trimming the branches for several miles and returning in the opposite direction to cut the branches on the opposite side without shifting blades from right to left.

With a tree trimming apparatus having 20 two foot blades the power available to the hydraulic motors (typically one for each 5 blades should be about 50 horsepower peak power and should be capable of driving the blades at approximately 2,000 to 3,000 RPM. The inertia of the blades is very significant due to their weight and large diameter and will aid greatly in cutting through large diameter branches when they are encountered.

It will be noted that the pivotal mounting of the apparatus about a crosswise horizontal axis not only aids in take-off and landing of the apparatus, but also permits the apparatus to yield slightly to the rear in encountering numerour branches or large branches. Thus while the helicopter speed may be five to ten feet per second the cutting speed of the blades through very large branches may be substantially less than that. Obviously the greater average speed attainable for the helicopter, the more cost effective the operation can be.

A pusher rod aids in pushing branches off of power lines as they are being cut and serves as a visual guide for the helicopter pilot in maintaining proper distance from the power line. The pusher rod is electrically insulated so that if it should come in contact with a power line no problem will be encountered.

The problem of encroachment of trees or other woody plants on power line right of ways and other locations which need to be kept free of trees and brush has been commonly attacked with herbicides; helicopters have played a large role in spraying herbicides for preventing encroachment of trees and plants on such right of ways. The spraying of herbicides is beset with problems and very unpopular with nearby land owners. Such land owners not uncommonly react with hostile action against the helicopter where they have suffered a real or imagined injury to person or property.

The alternative of cutting encroaching tree branches from ground vehicles is a very expensive and time consuming operation. No previous proposal is known whereby the trimming of tree branches for right of way clearance from an aircraft was rendered practical, safe, and efficient as by the present invention.

The use of multiple circular saw blades mounted on arms for use in trimming trees in orchards or similar circumstances has been known as shown in U.S. Pat. No. 4,067,178 issued to Charles Miller, Jan. 10, 1978, for example. While perhaps suitable for the orderly environment of a fruit orchard, such ground vehicle mounted apparatus is of limited use in trimming trees adjacent to electric utility right of way in rural and remote areas. Furthermore, the apparatus such as shown in U.S. Pat. No. 4,067,178 is clearly not adaptable to being mounted on a helicopter or other aircraft. A number of other patents show multiple circular saw blades for tree trimming purposes, some of which are listed below. These patents show noncoplanar circular saw blades which are even less adaptable to other than a controlled ground vehicle supported tree trimming operation.

| U.S. Pat. No. | Inventor | Date Issued |
| --- | --- | --- |
| 3,487,615 | C. O. Leydig et al | April 1, 1968 |
| 3,913,304 | Paul Jodoin | October 21, 1975 |
| 3,952,485 | L. R. McRobert | April 27, 1976 |
| 4,302,922 | H. F. Guerndt Jr. et al | December 1, 1981 |

The present invention permits rapid and accurate trimming of trees adjacent electric utility right of way in a safe manner. The trimming height of the array of blades may be forty feet or more with the use of twenty blades in an array. The closely adjacent blades which are coplanar causes the action of the blades set in effect to cause one blade to continue the cutting started by an adjacent blade where necessary in cutting large limbs. In use the boom carrying the saw blades will slope slightly backward from its attachment point at the helicopter so that branches cannot pass between two adjacent blades and fail to be cut. The pusher rod extending downward from the top of the boom acts to push tree branches off of and away from a power line as the branches are being cut and prevents cut branches being caught on the power line. Take-off and landing with the apparatus is a simple matter for a qualified helicopter pilot due to the articulation of the saw mounting boom permitting it to be laid out in front of the helicopter on the landing surface at take-off or landing.

In addition to providing the above described features and advantages it is an object of the present invention to provide a tree trimming apparatus for installation on a helicopter with a downward hanging boom carrying a plurality of power saws with blades nearly adjacent and arranged to provide a cutting swath of from twenty to fifty feet in height.

It is another object of the present invention to provide a helicopter mounted tree trimmer apparatus with circular saw blades mounted in coplanar relationship on a substantially vertical boom, said boom being articulated to prevent rotation about a vertical axis to permit rotation at least about a horizontal axis at right angles to the primary direction of travel of the helicopter.

It is still another object of the present invention to provide an airborne tree trimmer apparatus with multiple power saw blades on a vertical boom wherein a quick release hook and quick release hydraulic fittings permit the apparatus to be jettisoned in an emergency.

It is yet another object of the present invention to provide a helicopter mounted tree trimmer apparatus with multiple power saw blades arranged on a substantially vertical boom wherein a pusher rod exending slightly forward and to the other side of said boom acts to push tree branches off of or away from a power line as branches of trees adjacent thereto are being cut away.

Other objects and advantages of the present invention will be apparent from consideration of the following description in conjunction with the appended drawings in which:

FIG. 1 is a side elevational view of the airborne tree trimmer apparatus of the present invention as it appears in operation;

FIG. 2 is a perspective view of the apparatus of FIG. 1 on the ground preparatory to take-off or subsequent to landing;

FIG. 3 is a horizontal sectional view of the apparatus of FIG. 1 showing the action of the apparatus in cutting tree limbs adjacent an electric power line;

FIG. 4 is a partially schematic illustration of hydraulic apparatus within the helicopter;

FIG. 15 is an enlarged isometric view of the hydraulic line quick disconnect structure of FIG. 5.

Figure 5:
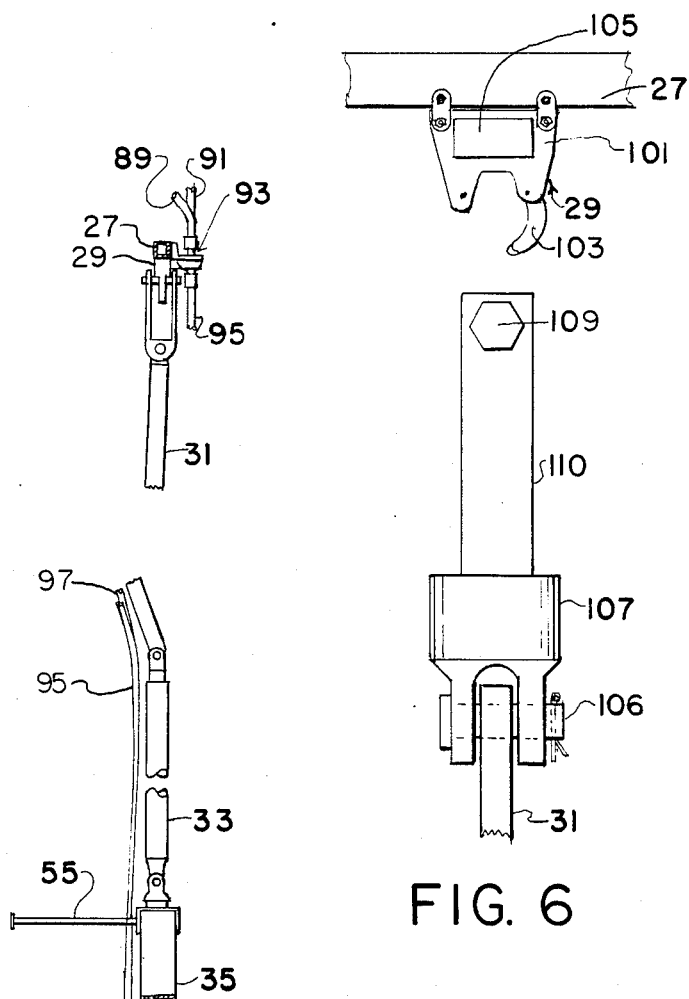
FIG. 5 is an enlarged, detailed, side elevational, partially fragmentary view of the boom apparatus shown in FIG. 1.

Referring now to the drawings and particularly FIG. 1, a helicopter 10 is shown equipped with airborne tree trimming apparatus 11 according to the invention. While a helicopter 10 has been specifically shown it will be understood that any aircraft capable of hovering (either a heavier-than-air or a lighter-than-air craft) could act as a support vehicle for the airborne tree trimming apparatus.

The helicopter 10 may be conventional and equipped with a single main rotor 13 or may be a multiple rotor craft. At the tail of the fuselage 15 is a tail rotor 17 of conventional form and the helicopter is equipped with a bubble cabin 19 and conventional landing skids 21. It has a lifting capacity of 500 to 1,000 pounds or more. A cable harness 25 supports a cross strut 27 to which there is demountably attached a leg member 31 of angular shape. As seen in FIG. 2 leg member 31 swings forward when the helicopter 10 is on the ground and is shaped to clear skids 21 and any other apparatus such as landing lights or the like which may be present on the front lower part of helicopter 10.

An extension link 33 is pivotally coupled at its top to the bottom of leg member 31 and has a connection, shown preferably as a pivotal connection, for the attachment of a bare boom element 35 at the bottom thereof. The pivotal connections at both the top and bottom of extension link 33 have an axis of rotation which is horizontal and substantially at right angles to the fore and aft axis of helicopter 10. As will later be seen the connection of leg member 31 to the undercarriage of helicopter 10 is such that rotation about the same axis is possible as well as rotation about a horizontal axis parallel to the fore and aft axis of the helicopter. Bare boom element 35, however, is constrained against any rotational movement about a vertical axis. Bare boom element 35 has secured thereto a rigid arm 37, which by reference to FIGS. 2 and 3 will be seen to extend at an angle forward and to the left of the helicopter center of lift. Suspended from arm 37 at a distance of from about eight to twelve feet from bare boom element 35 is a pusher rod 39 of fiberglass-reinforced plastic or other similar electrically nonconductive material. Arm 37 may also be of electrically nonconductive material, but alternatively may be of aluminum alloy or other suitable metal as will be the case with other structural portions of the tree trimer apparatus previously described.

Rigidly secured below bare boom 35 is an upper saw-mounting boom element 41 and a bottom saw-mounting boom element 43 which are provided respectively with motor drive units 45 and 47.

Each of the saw-mounting boom elements 41 and 43 is provided with five rotating circular saw blades 49 of approximately two foot diameter.

Landing and take-off with the airborne apparatus is facilitated by a stationary foot element 51, a hinged foot element 53, a center foot element 54, and a bipod element 55. All of the elements 51, 53, and 54 are arranged to be in the wake of the boom structure comprising booms 41 and 43 except that hinged foot elements 53 is arranged to swing upward on contact with a tree limb or the like while remaining in a depending position for landing.

FIG. 3 best shows the operation of the tree trimming apparatus in clearing tree limbs from an electrical power line right of way. While the section through bare boom element 35 is at right angles thereto, it should be understood that the entire boom structure 35, 41, 43 will not usually be exactly vertical and will in general tend to be slanted from top to bottom to the rear.

In FIG. 3 it will be observed that as certain tree branches 61 are cut by saw blade 49 the removed branch portions fall away so they do not interfere with boom sections 41 or 43. It is contemplated that the normal and usual operation of the airborne tree trimmimng apparatus will involve a single pass along each side of a power line right of way. Accordingly, apparatus having twenty or twenty-five saw blades rather than ten will often be desired. For simplicity, apparatus with ten blades is specifically illustrated with the understanding that the apparatus is designed to be modular with additional five blade boom sections being added at will. The additional saw blade mounting boom sections may be identical to upper boom element 41 whereas bottom boom element 43 differs slightly by having the hinged foot element 53 at the bottom thereof.

Whatever the number of blades installed, the helicopter flight path will be determined so that the uppermost blades 49 do not pass below any tree limbs to be cut. It should also be noted that the extension link 33 shown with a length of approximately twenty feet may be longer or may be omitted or a shorter link may be substituted especially when twenty or twenty-five saw blades are incorporated in the apparatus.

If, contrary to expectation, trees are encountered with limbs to be cut ranging in height by an amount greater than the total height of the array of saw blades, then they may be cut with two passes. The first pass would cut the highest branches somewhat closer to the tree than normal operation and the second pass would cut the lower branches with bare boom element 35 and extension link 33 passing through the space cleared by the first cut.

In FIG. 3 are shown a pair of electrical utility wires 63 which are overhung by a tree branch 65. It will be understood that frequency there will be more than two electrical power cables and sometimes other telephone wires strung on the same supports of the utility right of way, but this in no way interferes with the operation of the tree trimming apparatus of the invention.

As the helicopter with the airborne tree trimming apparatus suspended therefrom passes along the right of way branches such as 65 are contacted by pusher rod 39 which deflects backward as shown in FIG. 3 and at the same time tends to bend the branch 65 to reduce or eliminate its overhang on electric cables 63. When saw blade 49 comes in contact with tree branch 65 it may be bent to a substantial degree and as cut in two by the blade 49 will tend to fall to the near side of the right of way clear of the power cables 63. Pusher rod 39 does not extend to the bottommost saw blades 49 because such blades will normally be at a level below that of the electric power cable 63. Of course the length of pusher rod 39 may be adjusted or modified to maximize effectiveness in any particular situation. It will be noted in passing that pusher rod 39 is of insulating material because it normally comes in contact with branches 65 which in turn may be in contact with electric cables 63. Particularly if branches 65 are wet or sappy they will have sufficient electrical conductivity to pass a significant electric current. For this reason saw blades 49, though of electrically conductive material themselves, are preferably electrically insulated from their boom element 41 or 43 as will later be explained more fully.

Referring now to FIG. 4 the hydraulic apparatus for supplying power to the hydraulic motors 45 and 47 driving saws 49 is shown in partially schematic form. It will be understood that this apparatus will be mounted in the aircraft fuselage in a convenient manner according to standard practices. A hydraulic pump 71 is secured to a mechanical power take-off on the aircraft main engine or on an auxiliary engine, and a pair of hydraulic hoses 72 and 73 serve respectively as pressurized fluid output and return hoses for the pump 71. Hose 72 connects with a pressure hose 89 and also to a filter 75. From the filter 75 the pressure conduit is connected to an electrically operated valve 77 operated from a switch convenient to the pilot's position in the aircraft (not shown). A pressure gauge 79 may be connected on valve 77 for convenience. Valve 77 is connected between output line 72 of pump 71 and a hydraulic fluid reservoir 81. Thus when valve 77 is open the pressurized fluid flow from pump 71 is short circuited to reservoir 81 and no power is supplied through hose 89 to the saw blade motors for saw blades 49.

The hydraulic apparatus of FIG. 4 thus far described with the exception of pump 71 may be conveniently mounted on a strut 70 within the aircraft fuselage. Also mounted thereon is a hydraulic fluid surge reservoir 85 having a sight gauge 87 and connected to hydraulic fluid reservoir 81 by rigid tubing 83. A return hydraulic line 91 is also connected to hydraulic fluid reservoir 81. The apparatus described above shown in FIG. 4 is conventional and forms no part of the invention. Any suitable means for providing the required hydraulic fluid power in a range of about ten horsepower to about one hundred horsepower may be employed.

As also seen in FIG. 4, hoses 89 and 91 are secured to a quick disconnect fixture 93 from which the output and return conduits for hydraulic fluid continue through hoses 95 and 97 respectively. The detail construction of quick disconnect fitting 93 will be explained with reference to FIG. 15 hereinafter. It may be noted, however, that quick disconnect fixture 93 is secured on cross strut 27 which is located with its center at the center of lift of helicopter 10; thus the weight of the trimming apparatus which may amount to from five hundred to a thousand pounds is supported near the center of lift of the aircraft which is important for safe helicopter operation. Also, in the event that any stress is placed on quick disconnect fixture 93 before hoses 95 and 97 are released, this too will be applied at the center of lift of the helicopter and thus its stability will be maintained.

Figure 6:
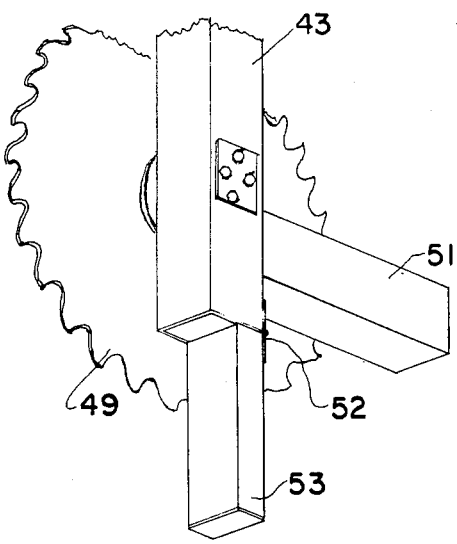
FIG. 6 is an enlarged, detailed, rear elevational view of the quick release hook apparatus of FIG. 5.

Mechanical disconnect hook 29 includes (as shown in FIG. 6) a body 101, a latchable hook 103, and an actuator mechanism 105. Actuator mechanism 105 is typically controlled by a switch on or near the aircraft control stick. Such release mechanisms for loads being transported by helicopter are well known and the details thereof will not be described. Quick release hook 29 engages an eye link 107 having a bolt 109 passing through two flanges 110. Bolt 109 and flanges 110 are dimensioned and spaced so that eye link 107 is secured in quick release hook fixture 29 without substantial freedom to rotate about a vertical axis. Eye link 107 will pivot about the axis of bolt 109 which runs fore and aft of helicopter 10. Leg member 31 is coupled to the bottom of eye link 107 by means of pin 106.

Figure 7:
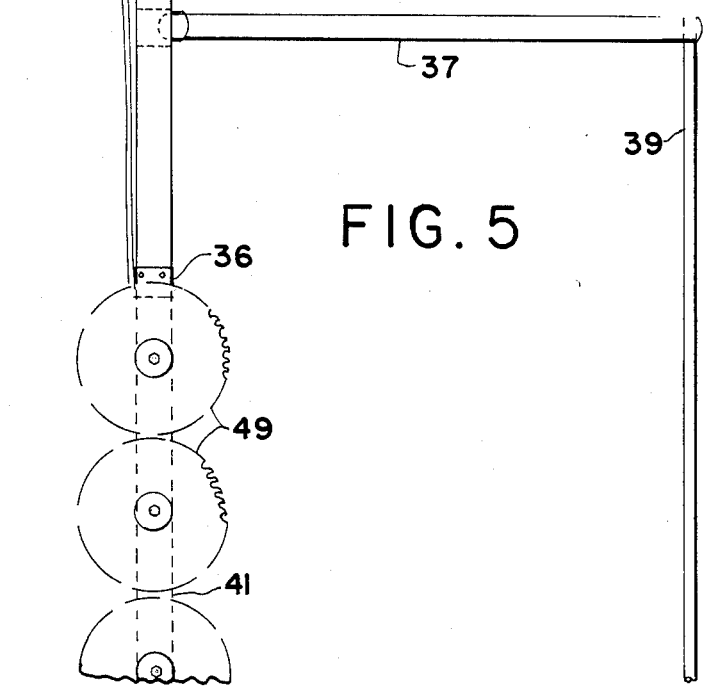
FIG. 7 is an enlarged fragmentary isometric view of the bottom portion of boom apparatus of FIG. 1.
Figure 8:
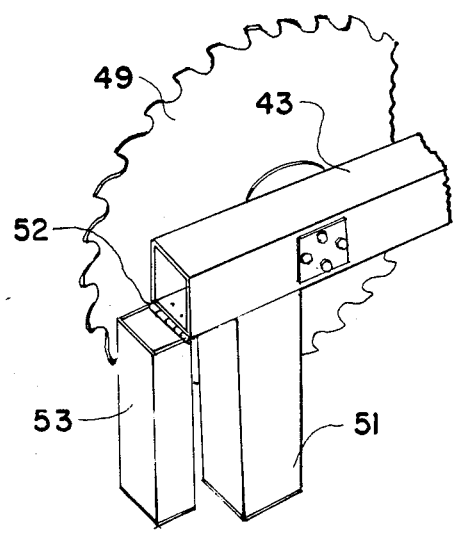
FIG. 8 is an enlarged fragmentary, detailed isometric view of the end of the boom apparatus in the position shown in FIG. 2.

FIG. 7 shows the bottom end of boom element 43 as it would appear in flight while FIG. 8 shows it in the landed position of the apparatus. As seen in FIG. 7 the hinged foot 53 is pivotally supported at the end of boom element 43 by a hinge 52 which permits hinged foot 53 to pivot back and up to avoid obstruction o the boom by tree branches below the level of saw 49.

Hinge 52 does not permit foot 53 to pivot forward. Thus in the landing operation which is conducted with the helicopter flying backward and downward at a slow rate of speed, foot 53 encounters the ground first and supports the boom 43 until stationary foot 51 is grounded. Thereafter when boom element 43 rests on the ground supported by foot 51, foot 54 and bipod 55, hinged foot 53 drops to the position shown in FIG. 8.

On take-off the motion of the helicopter is again backward but also upward at a slow rate and hinged foot 53 swings forward as necessary to assure that blade 59 does not strike the ground. Even though no significant power is supplied to blades 49 during the landing and take-off operation, they may be rotating at a slow rate of speed; in any event damage to the blades could occur if they were permitted to strike the ground and such contact is prevented by the operation of hinged foot 53, foot elements 51 and 54, and bipod 55. Bipod 55 is necessary to prevent sideways tipping of the boom structure while it is attached to the helicopter and is needed for bracing the structure once the constraint of the fastening to the helicopter 10 is removed.

FIGS. 9 through 14 show the manner in which five blades 49 are driven from hydraulic motor 45. In the preferred embodiment shown a belt drive is employed from the motor 45 to the center one of the five blade set and further belt drives from the center saw blade shaft drive the other four saw blades of the five blade set; these latter belt drives are concealed within and protected by the structure of boom element 41.

Figure 9:
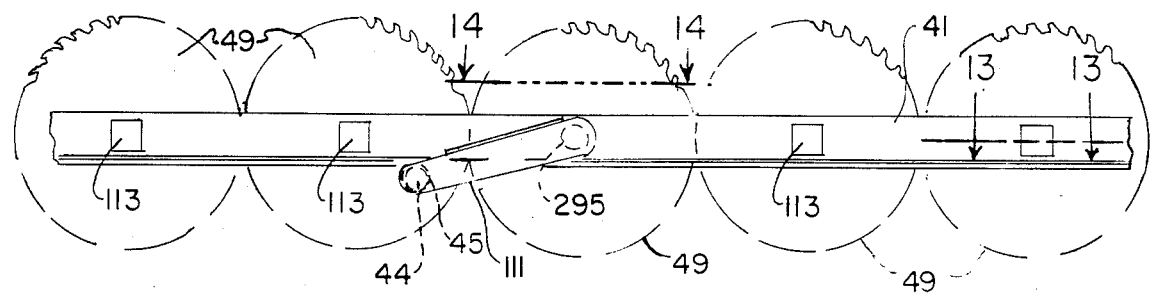
FIG. 9 is an enlarged side elevational view of the boom apparatus of FIG. 2 together with five of the saw blades mounted thereon.
Figure 10:
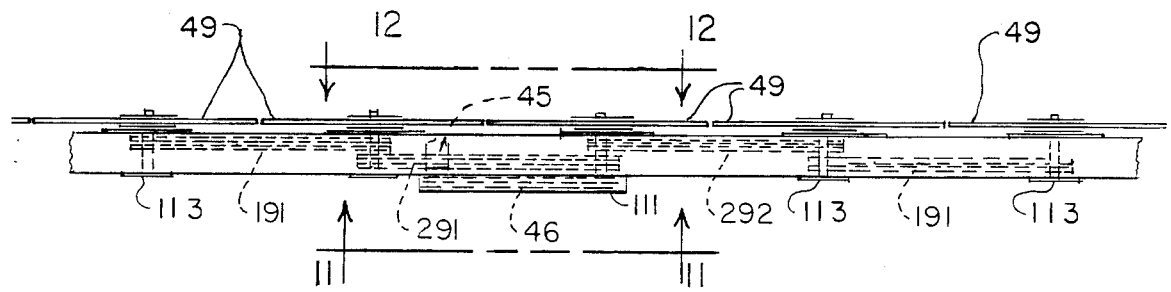
FIG. 10 is a detailed top plan view of the apparatus shown in FIG. 9.

As seen in FIG. 9 a belt guard 111 covers the belt drive from motor 45 to the center one of the saw blades 49. Hydraulic motor 45 is mounted on a motor bracket 121 secured to boom 41 and is also secured by belt shield 123.

Figure 11:
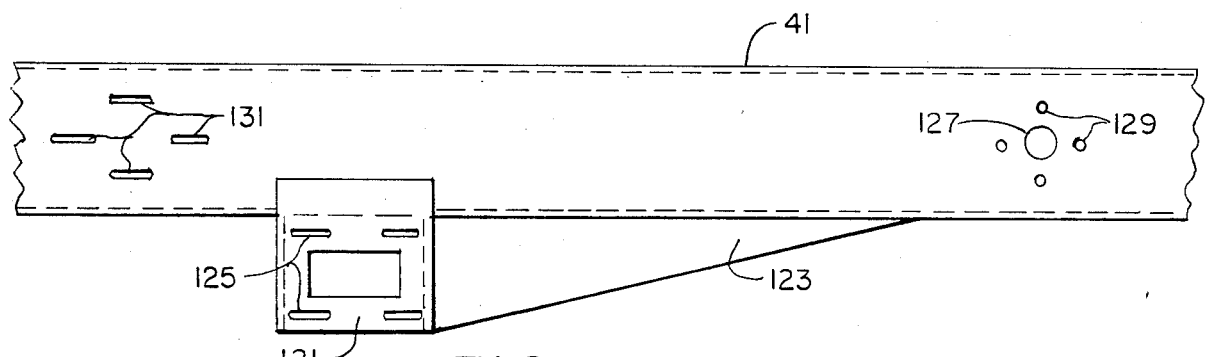
FIG. 11 is a further enlarged detailed view of the apparatus of FIG. 10 taken along the line 11—11 broken away to show the mounting brackets for blade bearings and hydraulic motor.
Figure 12:
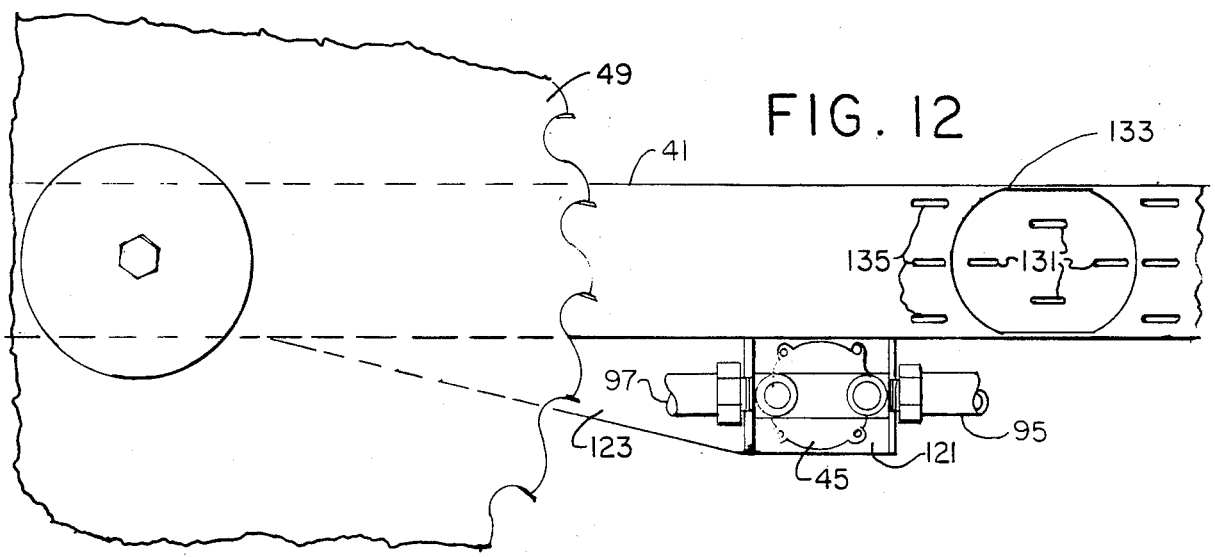
FIG. 12 is a partially fragmentary enlarged view broken away to show mounting brackets taken along the line 12—12 in FIG. 10.

As seen in FIG. 11 the mounting slots 125 for motor 45 in bracket 121 are elongated thus permitting the movement of motor 45 sufficient to obtain the proper tension in the belts 46 which it drives directly through pulley 44. A shaft opening 127 for the center saw blade and mounting holes 129 for the center saw blade bearing plate are not elongated as this one saw blade shaft is designed to be fixed and not adjustable. It will be noted that boom section 41 for the other four saw blades are provided with elongated mounting holes 131 to permit adjustment of the position of the other saw blades for adjusting belt tension to the proper value.

Figure 13:
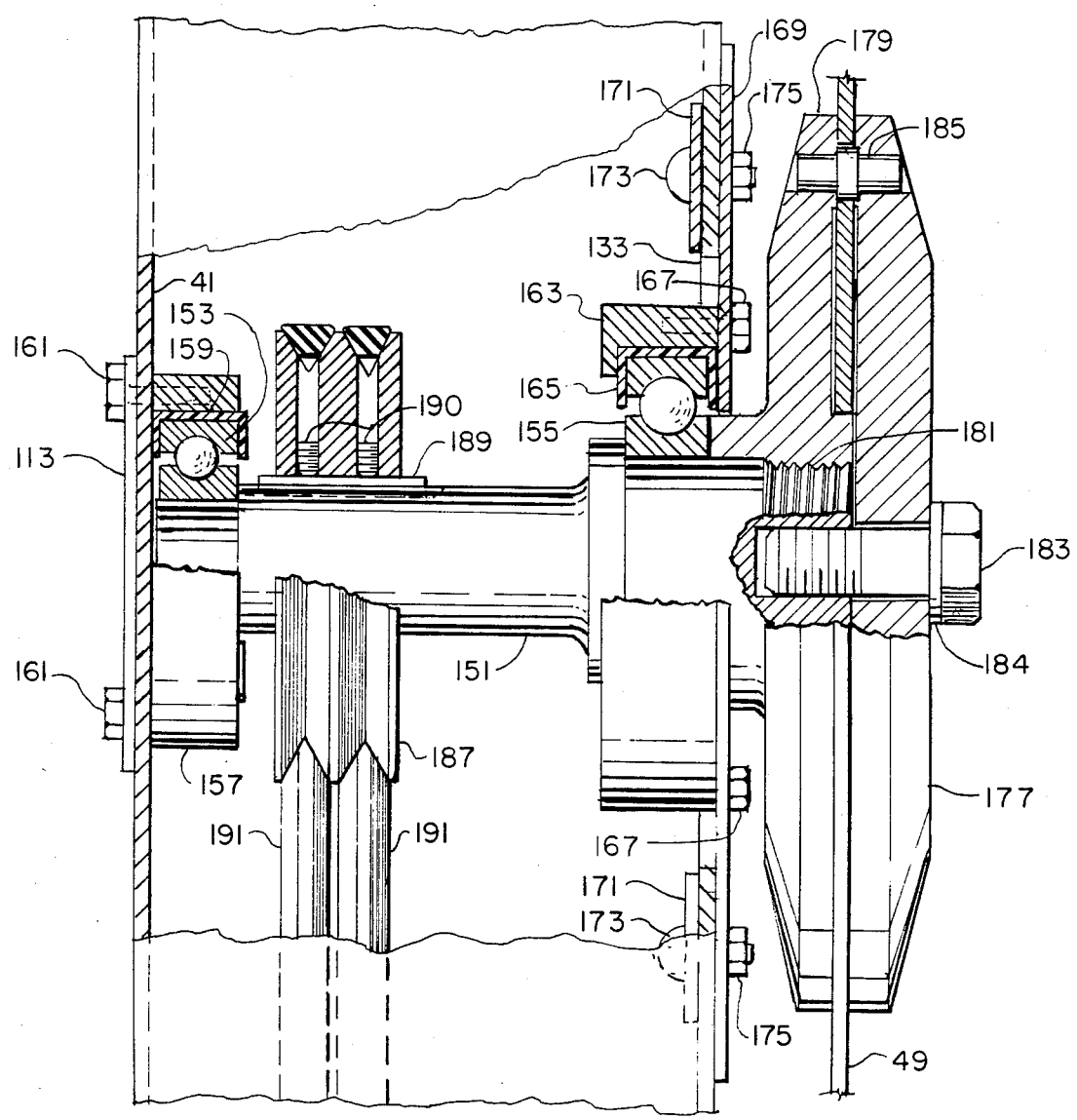
FIG. 13 is as fragmentary partially sectional view taken along the line 13—13 in FIG. 9.

As best seen in FIG. 13, an outer saw blade such as the top saw blade 49 is mounted on a shaft 151. Shaft 151 is rotatably secured in an anti-friction bearing 153 at its free end and by an anti-friction bearing 155 near the saw blade end. Bearing 153 is secured in a retainer 157 preferably including an insulator ring 159 serving to insulate the stationary portion of bearing 153 from retainer 157 and hence from boom 41. There is some liklihood that branches being cut by the saw blades such as 49 will be in contact with bare power line conductors and be sufficiently conductive to carry a significant current should a circuit to another power line or to the ground be completed. Insulating ring 159 prevents there being a conductive path through bearing 153 which in turn prevents current flow through the bearing which would be very detrimental; if very high voltages are involved it may be impossible to prevent arcs being generated from a saw blade or shaft to the boom 41 and thence through another saw blade. However, current flow through these portions of the apparatus can be tolerated to a greater extent than current flow through the anti-friction bearings. Of course one wishes to minimize such current flow and the pusher rod 139 acts to reduce contact of the tree branches with the power lines to reduce the likelihood or magnitude of any current flow from tree branches through the tree trimming apparatus.

Retainer 157 is secured by bolts threaded into tapped holes (not shown) in retainer 157 and bearing plate 113 aids in providing a rigid support for retainer 157. As previously mentioned, retainer 157 is adjustable in position by virtue of the elongated holes 131, through which pass bolts 161.

A bearing retainer 163 is provided for bearing 155 and insulation therebetween is provided by insulator ring 165, the function of which is similar to that of insulator 159 already described. Bolts 167 are received in tapped holes in retainer 163 and secure retainer 163 to mounting plate 169. Mounting plate 169 is retained in place by a backing plate 171 having threaded studs 173 welded or otherwise secured thereto. Studs 173 pass through the elongated holes 135 (shown in FIG. 12). Nuts 175 engaging studs 173 are tightened to secure mounting plate 169 in position. Mounting plate 169 and consequently bearing 155 are adjustable in position to the same extent as bearing plate 113 and bearing 153.

Saw blade 49 is mounted in place by means of an outer disk 177 and an inner disk 179. Disk 179 is provided with internal threads 181 which mate with external threads on the end of shaft 151. These threads are preferably lefthand threads so that the torque reaction on shaft 151 tends to tighten rather than loosen disk 179.

A bolt 183 is threaded into a tapped hole in the end of shaft 151 holding disk 177 in position; a washer 184 is provided for bolt 183. Key pins 185 fit in holes provided in disks 177 and 179 and engage matching holes in saw blade 49 to secure blade 49 to rotate with shaft 151.

Figure 14:
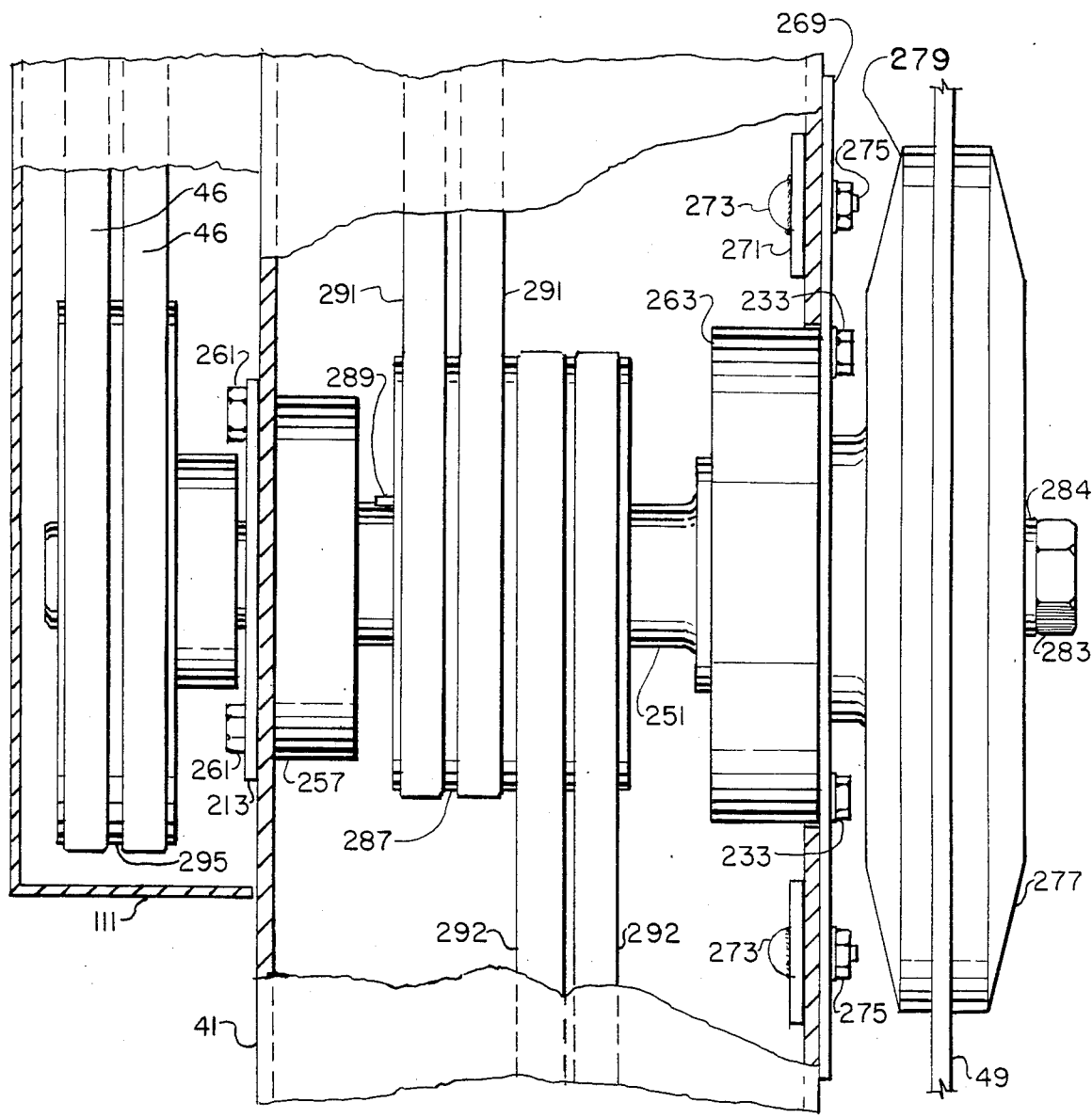
FIG. 14 is an enlarged fragmentary view partially broken away taken along the line 14—14 in FIG. 9.

FIG. 14 shows the mounting structure for a center one of a set of five saw blades and in general it will be seen to be similar to that shown in FIG. 13. The primary difference is that extra pulleys are provided in the apparatus of FIG. 14 to connect to the hydraulic motor drive and also to transmit power through belts in both directions to adjacent saw blades. Belts 46 from hydraulic motor pulley 44 engage with double pulley 295 mounted on shaft 251. Belt guard 111 keeps debris from the cutting operation or other objects from being caught in belts 46 and pulley 295. The drive pulley on motor 45 is not shown in detail but is similar to pulley 295 and preferably somewhat smaller. In the illustrated embodiment the pulley ratio from driver pulley to driven pulley is 3 to 5 so that a motor RPM of 5,000 will produce a saw blade RPM of 3,000. Bearing plate 213 is similar to bearing plates 113 except that it is provided with a central opening to accommodate shaft 251. There is also a central opening 127 in boom element 41 for shaft 251.

Bolts 261 pass through circular openings 129 in boom element 41 into tapped holes (not shown) in bearing retainer 257. Pulley 287 is a four-belt pulley and is keyed on shaft 251 by key 289 and secured by set screws not shown in FIG. 14.

Belts 291 serve to drive one of the saw blades adjacent to the central saw blade shown in FIG. 14 while belts 292 drive the other adjacent saw blade. The mounting for these adjacent saw blades will be similar to that shown in FIG. 13 except they will have four-belt pulleys similar to pulley 287 rather than the double belt pulley shown in FIG. 13.

Bearing retainer 263 holds the bearing for the shaft 251 adjacent to saw blade 49 and is itself held in place by bolts 233 received in tapped holes in bearing retainer 263 securing bearing retainer 263 to right bearing plate 269. Bearing plate 269 is secured to boom 41 by backup plate 271 having studs 273 extending through bearing plate 269 and held in place by nuts 275. The mounting for saw blade 49 in FIG. 14 is essentially the same as that shown in FIG. 13; inner disk 279 is threaded on the end of shaft 251 and shaft 251 has a tapped hole to receive bolt 283 which is provided with washer 284 and secures outer disk 277 in place. FIG. 15 shows in detail hydraulic quick disconnect fixture 93 which is secured by bolts 311 to cross strut 27. The two hydraulic hoses 89 and 91 from helicopter 10 have end fittings 313 and 315 which are threaded into quick disconnect elements 317. Conventional quick disconnect elements such as 317 are provided with a slidable spring-loaded release ring 319 which in the illustrated embodiment of FIG. 15 is formed of hemispherical shape and resides in a matching recess 321 in fixture 93. The disconnectible portion 323 of quick disconnect element 317 is threadedly engaged with an end fixture 325 or 326 on hose 95 or 97 leading down to hyraulic motor 45.

When release ring 319 is slid upward on quick disconnect 317 the disconnectible portion 323 is released. Disconnectible portion 323 has a male end portion not shown fitting upwardly into the upper portion of quick disconnect 317 and sealing therein. Hoses 95 and 97 are secured to arm 31 so that normally there is no downward force on quick disconnects 317. However, in the event that hook 103 is released and leg member 31 separates from helicopter 10 the downward force on hoses 95 and 97 causes release rings 319 to be forced upward on quick disconnects 317 thereby releasing the disconnectible portions 323 of the quick disconnects 317 severing the connection of hoses 95 and 97 from hoses 89 and 91 and completely freeing the tree trimming apparatus from the helicopter 10. FIG. 15 shows an exemplary form of automatic disconnecting hydraulic connectors and any other suitable arrangement for this purpose could be substituted.

From the foregoing description and explanation it will be seen that the tree trimmer apparatus of the present invention provides a highly effective mechanism for rapid trimming of trees and brush that encroach or threaten to encroach on electrical power lines or other utility rights of way. This apparatus is particularly expedient in those cases where overland access to the right of way is inconvenient or impossible by ground vehicles. In particular, it has great advantages over the use of herbicides in that the adverse effect on the environment of chemical spraying is eliminated. Apparatus according to the invention also may have less common uses in silviculture and may be used in trimming back fire breaks, security strips or other cleared areas that have become overgrown. It is not expected that the apparatus would find much use in cultivation of orchards, but even that is a possibility.

The apparatus has been described with reference to the principal embodiment using hydraulic power transmission to the motors mounted on the boom structure, but it will be appreciated that electrical power transmission might be employed. The trimmer apparatus may be modified by introducing a rotary actuator at the top of the saw booms to rotate the boom in flight to switch the saws from right to left. While circular saws have been utilized in the preferred embodiment of the apparatus it will be noted that chains saws might be substituted for some purposes. For example, a span of twenty feet which is covered by 10 two-foot diameter circular saws might be covered by 4 five-foot chain saws.

In addition to the modifications and variations of the invention that have been shown, described, or suggested, other variations and modifications will be apparent to those skilled in the art, and accordingly the scope of the invention is not to be deemed limited to the particular embodiments described or suggested but is rather to be determined by reference to the appended claims.

What is claimed is:

1. Airborne tree trimmer apparatus for installation on a helicopter or the like comprising
  a power source carried by said helicopter,
  boom mounting structure attachable to the underside of said helicopter,
  a boom pivotally mounted thereto about at least one horizontal pivot axis, saaid boom being restrained from rotation about a vertical axis,
  a plurality of wood cutting means mounted on said boom,
  at least one motor attached to said boom and connected to drive said cutting means, and
  power transmission means connected between said power source and said motor.

2. Apparatus as recited in claim 1 wherein said wood cutting means comprises at least two sets of at least three circular saws and one hydraulic motor, each set of saws being belt powered by said hydraulic motor and wherein all said saws are mounted nearly edge to edge in a common plane.

3. Apparatus as recited in claim 2 further including at least one foot extending rearwardly from said boom beyond the edge of said wood cutting means and adapted to hold said wood cutting means out of contact with the ground during landing and take-off.

4. Apparatus as recited in claim 1 further including at least one foot extending rearwardly from said boom beyond the edge of said wood cutting means and adapted to hold said wood cutting means out of contact with the ground during landing and take-off.

5. Apparatus as recited in claim 1 further including an arm extending laterally from said boom and a pusher rod depending therefrom to a position below the level of the upper cutting means.

6. Apparatus as recited in claim 1 wherein said boom mounting structure includes an extension link at least 10 feet in length depending downward under the center of lift of said helicopter.

7. Apparatus as recited in claim 1 further including a quick release hook remotely controlled from the helicopter's pilot station for separating said boom mounting structure to release and drop said apparatus.

8. Apparatus as recited in claim 1 having at least two motors wherein said motors are hydraulic motors, said power source includes a hydraulic pump and said power transmission means includes hydraulic hoses connected therebetween.

9. Apparatus as recited in claim 8 further including an automatic quick disconnect fixture for separating said hoses to release said apparatus, said fixture being adjacent the point of attachment of said mounting structure to said helicopter.

10. Airborne tree trimmer apparatus for installation on a helicopter or the like comprising
  a power source carried by said helicopter, said power source being independent of the main helicopter engine,
  boom mounting structure attachable to the underside of said helicopter,
  a first boom pivotally mounted thereto about at least one pivot axis, said pivot axis being horizontal and traverse to the principal direction of flight of said helicopter, said first boom being restrained from rotation about a vertical axis, a plurality of saw blades mounted on said first boom for rotation about axes parallel to said pivot axis, said blades being arranged in a common plane and nearly adjacent one another, at least one motor attached to said first boom and connected to drive said saw blades, a second boom connected at the lower end of said first boom, a plurality of circular saw blades mounted on said second boom, said blades being in a common plane with the blades of said first boom, at least one motor attached to said second boom and connected to drive the saw blades thereon, and power transmission apparatus connected between said power source and each said motor.

11. Apparatus as recited in claim 10 wherein said saw blades comprise a set of at least three circular saws on each said boom, each said set being belt powered from a respective one of said motors.

12. Apparatus as recited in claim 10 further including at least one foot extending rearwardly from said boom beyond the edge of said saw blades and adapted to hold said blades out of contact with the ground during landing and take-off.

13. Apparatus as recited in claim 10 further including an arm extending laterally from said boom and a pusher rod depending therefrom to a position below the level of the upper one of said saw blades.

14. Apparatus as recited in claim 10 further including a quick release hook remotely controlled from the helicopter's pilot station for separating said boom mounting structure to release and drop said apparatus.

15. Apparatus as recited in claim 10 wherein said motors are hydraulic motors, said power source includes a hydraulic pump and said power transmission means includes hydraulic hoses connected therebetween.

16. Apparatus as recited in claim 15 further including an automatic quick disconnect fixture for separating said hoses to release said apparatus.

17. Airborne helicopter-mounted tree trimmer apparatus comprising a helicopter with a cargo lift capacity of at least 400 lbs.

a power source carried by said helicopter, boom mounting structure attached to the underside of said helicopter near the center of lift thereof, a first boom pivotally mounted thereto about at least one pivot axis, said pivot axis being horizontal and transverse to the principal direction of flight of said helicopter, said first boom being restrained from rotation about a vertical axis, a plurality of circular saw blades mounted on said first boom for rotation about axes parallel to said pivot axis, said blades being arranged in a common plane and nearly adjacent one another, at least one motor attached to said first boom and connected to drive said saw blades, a second boom connected to the lower end of said first boom, a plurality of circular saw blades mounted on said second boom, said blades being in a common plane with the blades of said first boom, at least one motor attached to said second boom and connected to drive the saw blades thereon, and flexible power transmission apparatus connected between said power source and each said motor.

18. Apparatus as recited in claim 17 further including at least one foot extending rearwardly from said boom beyond the edge of said saw blades and adapted to hold said blades out of contact with the ground during landing and take-off.

19. Apparatus as recited in claim 17 further including an arm extending laterally from said boom and a pusher rod depending therefrom to a position below the level of the upper one of said saw blades.

20. Apparatus as recited in claim 17 wherein said motors are hydraulic motors, said power source includes a hydraulic pump and said power transmission means includes hydraulic hoses connected therebetween.

21. Airborne helicopter-mounted tree trimmer apparatus comprising a helicopter with a cargo lift capacity of at least 400 lbs, boom mounting structure attached to the underside of said helicopter near the center of lift thereof, a first boom pivotally mounted thereto about at least one pivot axis, said pivot axis being horizontal and transverse to the principal direction of flight of said helicopter, said first boom being restrained from rotation about a vertical axis, a plurality of circular saw blades mounted on said first boom for rotation about axes parallel to said pivot axis, said blades being arranged in a common plane and nearly adjacent one another, drive means attached to said first boom and connected to drive said saw blades, a second boom connected at the lower end of said first boom, a plurality of circular saw blades mounted on said second boom, said blades being in a common plane with the blades of said first boom drive means attached to said second boom and connected to drive the saw blades thereon, a power source carried by said helicopter, and power transmission apparatus connected between said power source and each said drive means.

22. Apparatus as recited in claim 21 further including at least one foot extending rearwardly from said boom beyond the edge of said saw blades and adapted to hold said blades out of contact with the ground during landing and take-off.

23. Apparatus as recited in claim 21 further including an arm extending laterally from said boom and a pusher rod depending therefrom to a position below the level of the upper one of said saw blades.

* * * * *